(12) United States Patent
Hall et al.

(10) Patent No.: US 7,319,410 B2
(45) Date of Patent: Jan. 15, 2008

(54) DOWNHOLE TRANSMISSION SYSTEM

(75) Inventors: David R. Hall, Provo, UT (US); Joe Fox, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 364 days.

(21) Appl. No.: 10/878,193

(22) Filed: Jun. 28, 2004

(65) Prior Publication Data

US 2005/0285754 A1 Dec. 29, 2005

(51) Int. Cl.
*G01V 3/00* (2006.01)

(52) U.S. Cl. ............................. 340/854.8; 340/854.9; 340/855.1; 439/577; 324/333; 324/339; 166/381

(58) Field of Classification Search ............. 340/854.8, 340/855.1, 854.9, 854.6, 854.7, 853.3; 166/381; 324/333, 339
See application file for complete search history.

(56) References Cited

U.S. PATENT DOCUMENTS

| | | | |
|---|---|---|---|
| 2,414,719 A | 1/1947 | Cloud | |
| 3,518,608 A | 6/1970 | Papadopoulos | |
| 4,739,325 A | 4/1988 | MacLeod | |
| 4,788,544 A | 11/1988 | Howard | |
| 4,914,433 A | 4/1990 | Galle | |
| 6,012,015 A | 1/2000 | Tubel | |
| 6,252,518 B1 | 6/2001 | Laborde | |
| 6,392,317 B1 | 5/2002 | Hall et al. | |
| 6,443,763 B1 | 9/2002 | Richet | |
| 6,587,054 B2 * | 7/2003 | Besser et al. ............ | 340/854.9 |
| 6,670,880 B1 | 12/2003 | Hall et al. | |
| 6,688,396 B2 | 2/2004 | Floerke et al. | |
| 6,692,299 B1 | 2/2004 | Stockmaster | |
| 6,717,501 B2 | 4/2004 | Hall et al. | |
| 6,799,632 B2 | 10/2004 | Hall et al. | |
| 6,815,617 B1 * | 11/2004 | Gebs et al. ............ | 174/113 AS |
| 6,821,147 B1 | 11/2004 | Hall et al. | |
| 6,830,467 B2 | 12/2004 | Hall et al. | |
| 6,844,498 B2 | 1/2005 | Hall et al. | |
| 6,866,306 B2 * | 3/2005 | Boyle et al. ................ | 285/333 |
| 6,888,473 B1 | 5/2005 | Hall et al. | |
| 6,903,660 B2 * | 6/2005 | Clark et al. .............. | 340/854.8 |
| 6,913,093 B2 | 7/2005 | Hall et al. | |
| 6,929,493 B2 | 8/2005 | Hall et al. | |

(Continued)

OTHER PUBLICATIONS

PCT/US 03/16475, Published Dec. 4, 2003, Applicant Baker Hughes; International Search Report: "Documents Considered to Be Relevant".

*Primary Examiner*—Jeffery Hofsass
*Assistant Examiner*—Sisay Yacob
(74) *Attorney, Agent, or Firm*—Jeffery D. Daly; Tyson J. Wilde

(57) ABSTRACT

A transmission system in a downhole component comprises a data transmission element in both ends of the downhole component. Each data transmission element houses an electrically conducting coil in a MCEI circular trough. An electrical conductor connects both the transmission elements. The electrical conductor comprises at least three electrically conductive elements insulated from each other. In the preferred embodiment the electrical conductor comprises an electrically conducting outer shield, an electrically conducting inner shield and an electrical conducting core. In some embodiments of the present invention, the electrical conductor comprises an electrically insulating jacket. In other embodiments, the electrical conductor comprises a pair of twisted wires. In some embodiments, the electrical conductor comprises semi-conductive material.

8 Claims, 16 Drawing Sheets

U.S. PATENT DOCUMENTS

| | | |
|---|---|---|
| 6,945,802 B2 | 9/2005 | Hall et al. |
| 2002/0193004 A1* | 12/2002 | Boyle et al. ................ 439/577 |
| 2003/0169179 A1* | 9/2003 | James, II ................ 340/854.9 |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0230149 A1* | 10/2005 | Boucher et al. ............... 175/48 |
| 2005/0236160 A1 | 10/2005 | Hall et al. |

* cited by examiner

DOWNHOLE TRANSMISSION SYSTEM

FEDERAL SPONSORSHIP

This invention was made with government support under contract number No. DE-FC26-01NT41229 awarded by the Department of Energy. The government has certain rights in this invention.

CROSS REFERENCE TO RELATED APPLICATIONS

None

BACKGROUND

This invention relates to downhole transmission systems. U.S. Pat. No. 6,670,880, which is herein incorporated by reference, discloses a downhole transmission system through a string of downhole components. A first data transmission element is located in one end of each downhole component, which includes a first magnetically-conductive, electrically-insulating trough, and a first electrically conductive coil lying there in. A second data transmission element is located in the other end, with a similar arrangement comprising a second magnetically-conductive, electrically-insulating trough and a second electrically conductive coil. The transmission system further comprises an electrical conductor in electrical communication with and running between each first and second coil in the downhole component. The string of downhole components is cooperatively arranged such that the troughs are in magnetic communication with each other and transmit signals through induction. Each downhole component comprises electrical characteristics such as impedance, reactance, capacitance and inductance.

U.S. Pat. No. 4,914,433 discloses an improved electrical transmission system for transmitting electrical power and data signals within a well bore having a string of tubular members suspended within it, each tubular member having a receiving end adapted for receiving data signals and a transmitting end for transmitting signals. The receiving end and transmitting end being electrically coupled by a flexible printed planar conductor of the type having at least one substantially planar conductive band disposed between at least two layers of electrically insulating material.

It should be noted that the term "magnetically-conducting, electrically-insulating material" will be referred to in the rest of this specification as MCEI material.

SUMMARY OF THE INVENTION

A transmission system in a downhole component comprises a data transmission element in both ends of the downhole component. Each data transmission element houses an electrically conducting coil in a MCEI circular trough. An electrical conductor connects both the transmission elements. The electrical conductor comprises at least three electrically conductive elements insulated from each other.

The downhole component may be part of a drill string. Alternately, the downhole component is part of a production well. Preferably, the downhole component is a pipe. In some embodiments of the present invention the downhole component comprises a tool. In the preferred embodiment, the MCEI trough comprises ferrite. Preferably, the electrically conducting coil comprises a wire. More preferably, the electrically conducting coil comprises an insulated wire. Preferably, the electrical conductor is disposed in a passage in the downhole component. In one aspect of the present invention, the electrical conductor is expandable.

In some embodiments of the present invention, the electrical conductor comprises an electrically insulating jacket. Preferably, the electrical conductor comprises an electrical conducting outer shield, an electrically conducting inner shield, and an electrically conducting core.

Alternately, the electrical conductor comprises a pair of twisted wires. The electrical conductor may comprise a shielded pair of twisted wires. In some embodiments, the electrical conductor comprises semi-conductive material. In some embodiments of the present invention, the electrical conductor comprises a ribbon cable. In other embodiments of the present invention, the electrical conductor comprises a coaxial spacer. In one embodiment of the present invention, at least one of the electrically conducting elements comprises a spiral wire.

Generally, the core is solid. The core may be a stranded core. In some embodiments of the invention, the core is a double core.

In some embodiments of the present invention, the inner shield comprises at least one metal foil. In other embodiments, the inner shield is coated with a metal layer. In some embodiments the outer shield is a double shield. In some embodiments of the present invention, the inner shield is a solid shield. In some aspects of the invention, the inner shield is a braided shield. In some embodiments, the inner shield is a taped shield.

The several embodiments of the present invention are believed to increase the reliability, improve impedance matching, and reduce noise interference within the downhole component. By providing one or more electrical elements in an electrical conductor, damage to one electrical element may not disrupt the transmission system. In other aspects of the invention, double cores and double shields may improve reliability of a downhole component experiencing tension from the weight of a downhole tool string. It is believed that an outer shield absorbs noise interferences and insulates the other electrical elements carrying the signal and the electrical elements that are return paths from experiencing the noise interferences; thereby, reducing signal reflections and attenuation.

DETAILED DESCRIPTION OF THE PREFERRED EMBODIMENTS

The disclosed description is meant to illustrate the present invention and not limit its scope. Other embodiments of the present invention are possible within the scope and spirit of the claims.

Figure 1:
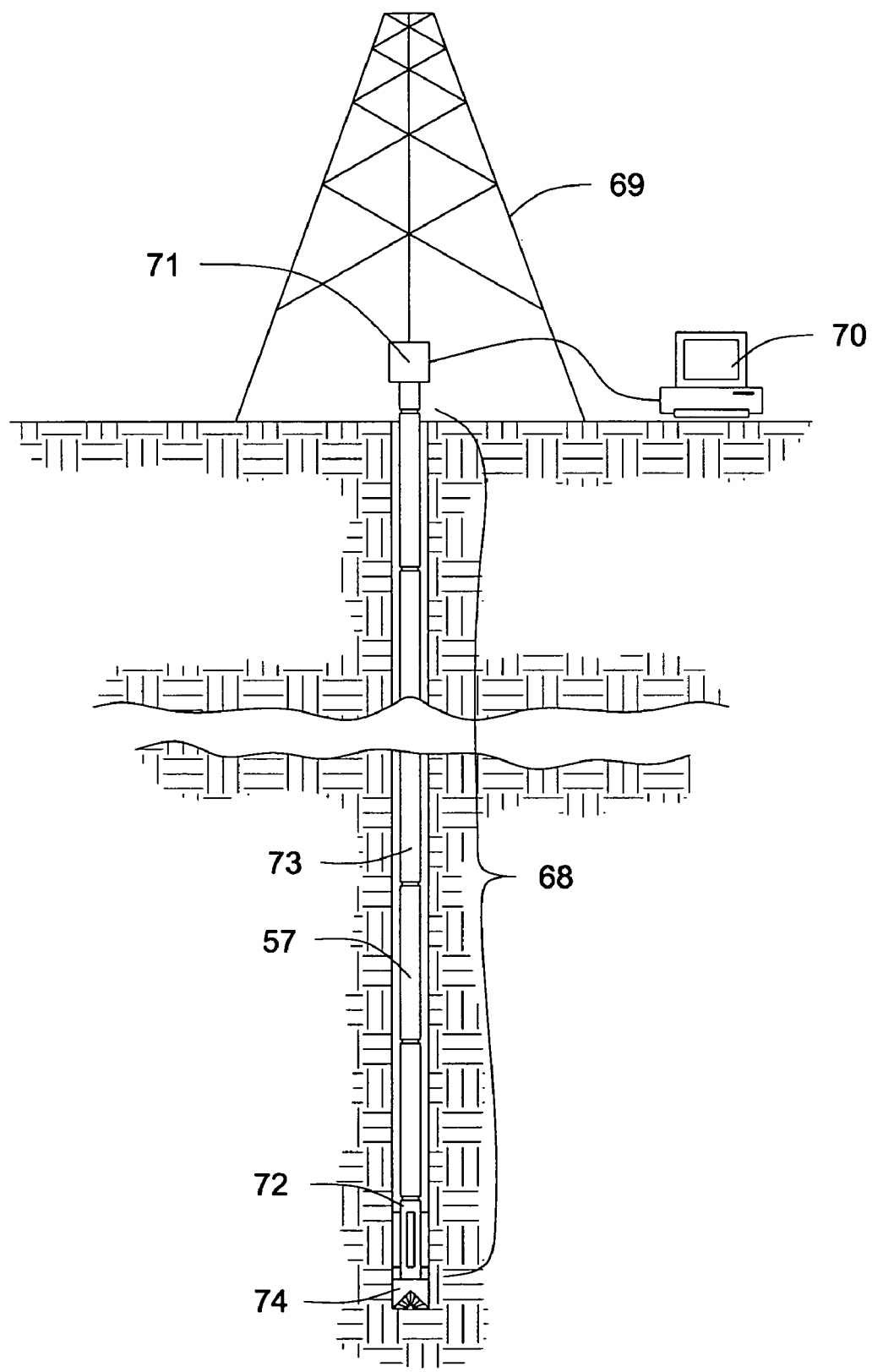
FIG. 1 is a partial view of an embodiment of a downhole tool string.

FIG. 1 shows an embodiment of a downhole tool string 68 suspended in a well bore by a derrick 69. Surface equipment 70, such as a computer, connects to a data swivel 71. The data swivel 71 is adapted to transmit data to and from an integrated transmission network while the downhole tool string 68 is rotating. The integrated transmission network comprises the transmission systems of the individual components 72, 73, 74, 57 of the downhole tool string 68. The downhole component may be a tool 72, or a pipe 73. Tools 72 may be located in the bottom hole assembly 74 or along the length of the downhole tool string 68. Examples of tools 72 on a bottom hole assembly 74 comprise sensors, drill bits, motors, hammers, and steering elements. Examples of tools 72 located along the downhole tool string 68 are links, jars, seismic sources, seismic receivers, sensors, and other tools that aid in the operations of the downhole tool string 68. Different sensors are useful downhole such as pressure sensors, temperature sensors, inclinometers, thermocouplers, accelerometers, and imaging devices. Preferably the downhole tool string 68 is a drill string. In other embodiments the downhole tool string 68 is part of a production well.

Figure 2:
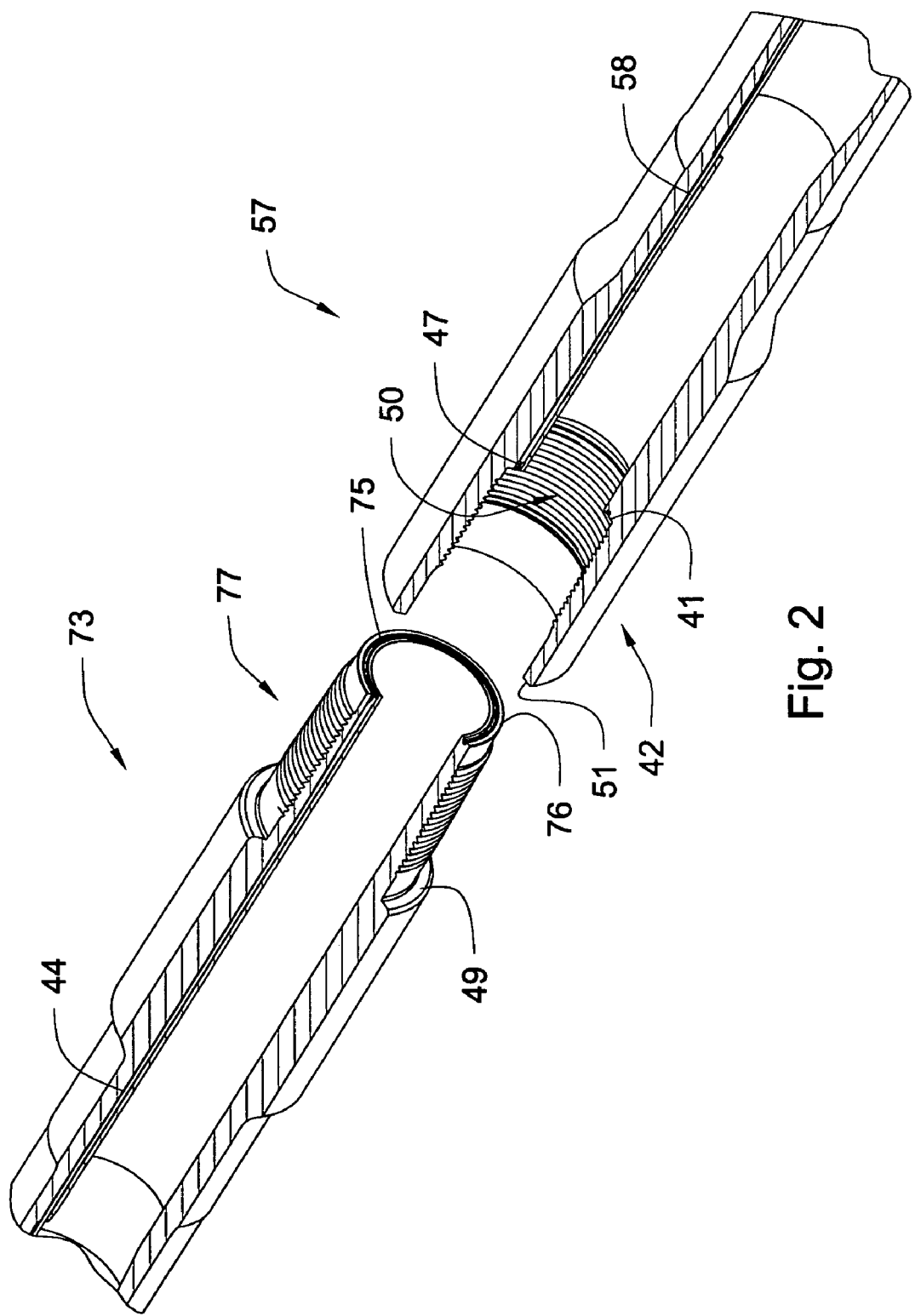
FIG. 2 is a perspective cross sectional view of an embodiment of downhole components.
Figure 5:
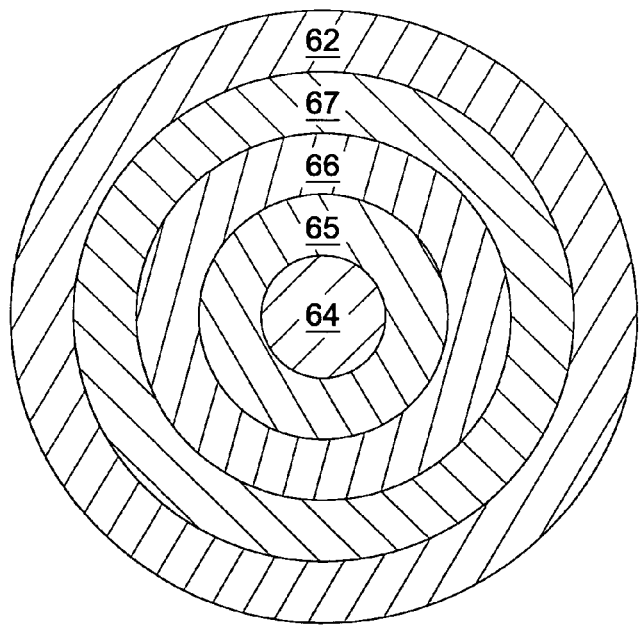
FIG. 5 is a cross sectional view along line 5-5 of FIG. 4.

The downhole tool string 68 is made up of components, as shown in FIG. 2. The components may be pipes 73, 57 or some of the above mentioned tools 72. The components 73, 57 comprise data transmission elements 75 located in the secondary shoulder 76 of the pin end 77 and in the secondary shoulder 41 of the box end 42 of the components 73, 57. Typically, the transmission elements 75 comprise a MCEI circular trough (shown in FIG. 3) which is disposed in an annular groove formed in the secondary shoulders 76, 41. In one embodiment, the annular groove is formed in a metal ring. The metal ring 43 is typically made of steel. In one embodiment, the metal ring 43 is made of stainless steel. The data transmission elements 75 are connected by an electrical conductor 44. Preferably the electrical conductor 44 comprises an electrically conducting outer shield 62, an electrically conducting inner shield 66, and an electrically conducting core 64, as shown in FIG. 5.

The transmission elements 75 typically comprise an inductive coupler. The inductive coupler houses an electrically conductive coil 45 embedded in the MCEI trough 46. Preferably the MCEI trough 46 comprises ferrite. In other embodiments the MCEI trough 46 comprises soft iron, nickel iron alloys, silicon iron alloys, cobalt iron alloys or mu-metals. The electrically conducting coil 45 typically comprises one or more loops of insulated a wire. Preferably, the coil 45 comprises one loop of insulated wire. The wire may be made of copper and may be insulated with varnish, enamel, or a polymer. When the components 73, 57 of the downhole tool string 68 are made up, the transmission elements 75, 47 line up adjacent each other and allow data transmission between components 57, 73. A threaded portion 48 located between the primary shoulder 49 and secondary shoulder 76 of the pin end 77 and a threaded portion 50 located between the primary shoulder 51 and secondary shoulder 41 of the box end 42 provide a means of attachment for the downhole components 73, 57.

Figure 3:
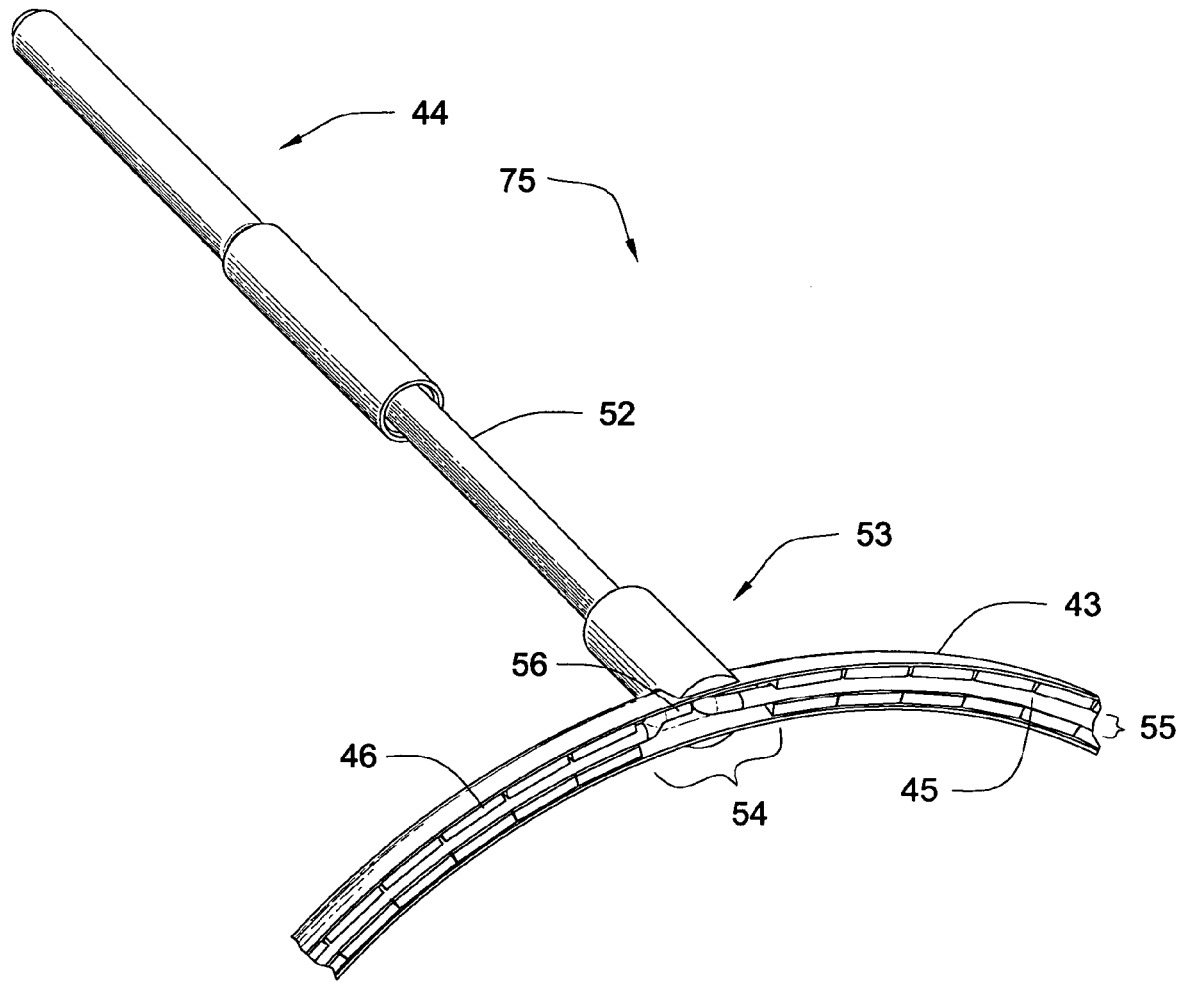
FIG. 3 is a partial perspective view of an embodiment of a transmission element.

FIG. 3 shows an embodiment of a connection between the electrical conductor 44 and the electrically conducting coil 45. In the preferred embodiment, a signal travels along the electrical conductor 44 in a downhole component 73. The signal passes from the electrical conductor 44 to a lead wire 52 of the coil 45. The transmission element 75 comprises an anti-rotation device 53, which keeps the metal ring 43 from rotating about the axis of the lead wire 52. In the lead wire 52 may enter the metal ring 43 through a hole in the metal ring 43, where there is a void 54 in the MCEI trough 46. The coil 45 is housed in a channel 55 formed by a MCEI circular trough 46 and is grounded to the metal ring 43 in the void 54 of the MCEI trough 46. Preferably, the grounded portion 56 of the coil 45 is brazed to the metal ring 43. In some embodiments of the present invention, the coil 45 and MCEI trough 46 are disposed in a groove formed by the secondary shoulders 76, 41 of both the pin end 77 and also in the box end 42 of the downhole component 73.

In the preferred embodiment the MCEI material 46 is a segmented circular trough of MCEI material. The MCEI material 46 is typically held in place by an electrically-insulating filler material. Preferably the filler material is selected from the group consisting of epoxy, natural rubber, fiberglass, carbon fiber composite, a polymer, polyurethane, silicon, a fluorinated polymer, grease, polytetrafluoroethylene and perfluoroalkoxy, or a combination thereof.

As the signal travels along the coil 45, the magnetic field from the electrical current is magnified by the MCEI trough 46. The magnified magnetic field influences the MCEI trough 46 in the adjacent transmission element 47 in the adjacent downhole component 57. The electrically conducting coils 45 are arranged in a manner to allow the magnetic fields to generate a magnetic transmission circuit. A magnetic transmission circuit may be allowed by disposing one coil 45 in a clockwise direction in the MCEI circular trough 46 and disposing an adjacent coil in a counterclockwise direction in an adjacent MCEI circular trough 46. The coil in the adjacent transmission element 47 is influenced by the magnetic transmission circuit to generate an electrical current and that signal is passed to the electrical conductor 58 in the adjacent downhole component 57.

Figure 4:
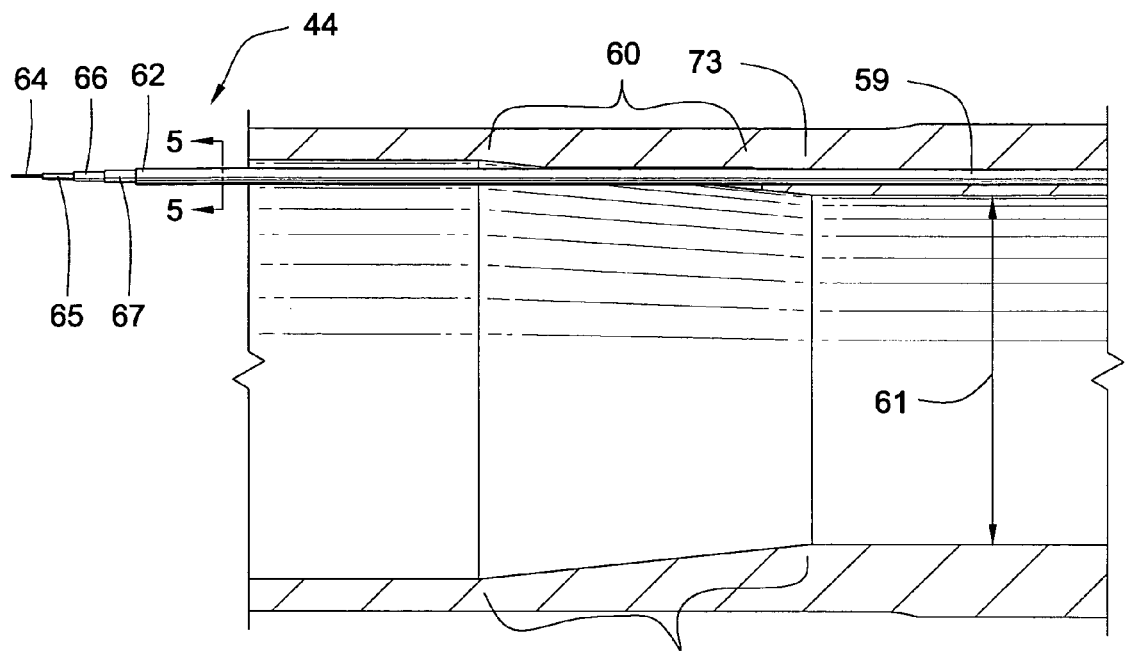
FIG. 4 is a cross sectional view of an embodiment of a downhole component.

In the preferred embodiment, the electrical conductor 44 is disposed in a passage 59 in the downhole component. The lead wire 52 is also disposed in the passage 59. In this embodiment the passage 59 runs from the secondary shoulder 76 to an opening 60 in the inner diameter 61 of the downhole component 73. The passage 59 may be a drilled hole. FIG. 4 shows an embodiment of the electrical conductor 44 disposed inside the downhole component 73. In this embodiment, the inner diameter 61 of the downhole component 61 narrows at the ends of the component 73. The electrical conductor 44 exits the passage 59 through the opening 60 in the region 63 where the inner diameter 61 of the component 73 narrows.

The electrical conductor 44 comprises an inner core 64, an inner dielectric 65, an inner shield 66, an outer dielectric 67, and an outer shield 62. In some embodiments, the electrical conductor 44 comprises an electrically insulating jacket 90. The outer shield 62 is insulated by the insulating jacket 90 (shown in FIG. 14). In the preferred embodiment the outer shield 62 is in electrical communication with the passage 59. The downhole component 73 then acts as ground for the electrical conductor 44. In another embodiment, the passage 59 is lined by a metal tube (not shown), which provides protection to the outer shield 62 of the electrical conductor 44 throughout the length of the downhole component 73.

FIG. 5 is a cross section of FIG. 4 along line 5-5. It is believed that a signal is carried by an inner core 64 of the electrical conductor 44 and the inner shield 66 is the return path. Noise currents from the downhole components 57, 72, 73, 74 flow on the outer shield 62 of the electrical conductor 44. It is believed that in this embodiment of the present invention, the noise currents and the return currents do not flow through a common conductor, which reduces noise coupling; thereby, reducing signal loss and attenuation. Further, the outer shield 62 may protect the inner shield 66 and inner core 64 from damage and allow signal transmission despite any damage to the outside of the electrical conductor 44.

Figure 6:
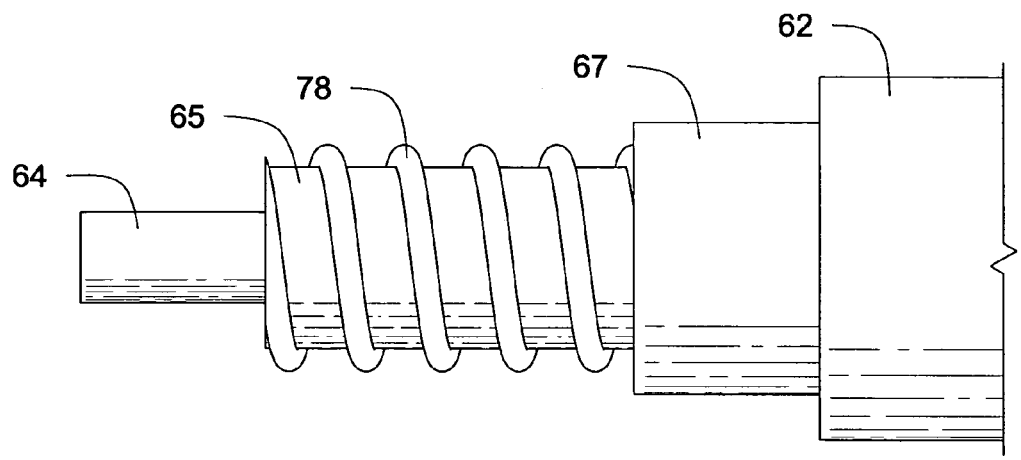
FIG. 6 is an exploded view of an embodiment of an electrical conductor.

An embodiment of the electrical conductor 44 is shown in FIG. 6. The electrical conductor 44 comprises an inner core 64, an inner dielectric 65, a spiral wire 78, an outer dielectric 67, and an outer shield 62. In some embodiments, the spiral wire 78 is the return path. It is believed that a spiral wire 78 may allow for greater tolerances in component length and also reduce damage that may be caused by tension created from the weight of the downhole tool string 68.

Figure 7:
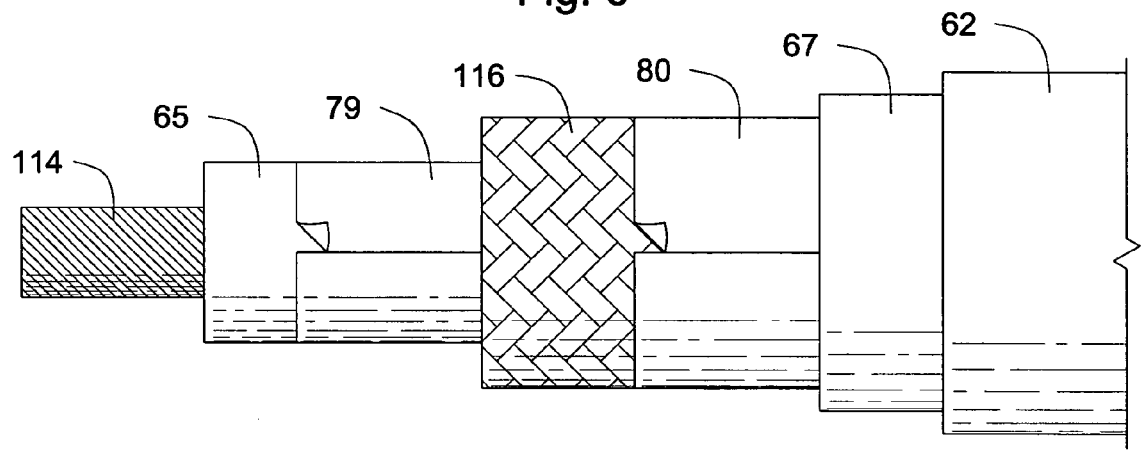
FIG. 7 is an exploded view of an embodiment of an electrical conductor.

FIG. 7 shows an embodiment of the electrical conductor 44, where the inner dielectric 65 and the inner shield 66 are wrapped in a first metal foil 79 and second metal foil 80, respectively. The metal foils 78, 80 may be made of tin, sliver, aluminum, nickel, or alloys thereof. In other embodiments of the present invention, the inner shield 66 is coated with a metal layer. The metal layer may be tin, silver, aluminum, nickel or alloys thereof. In other embodiments the inner core 64 comprises a metal foil or a coated metal layer. In other embodiments the outer shield 62 comprises a metal foil or a coated metal layer. It is believed that the metal layer or metal foil 79, 80 may improve high-temperature capability and is beneficial in higher frequencies. In some embodiments of the present invention, only one circumference of conductive elements 64, 66, 62 comprise the metal layer or metal foil. In the embodiment shown in FIG. 7, the inner core 64 is a stranded core 114 and the inner shield 66 is a braided shield 116.

Figure 8:
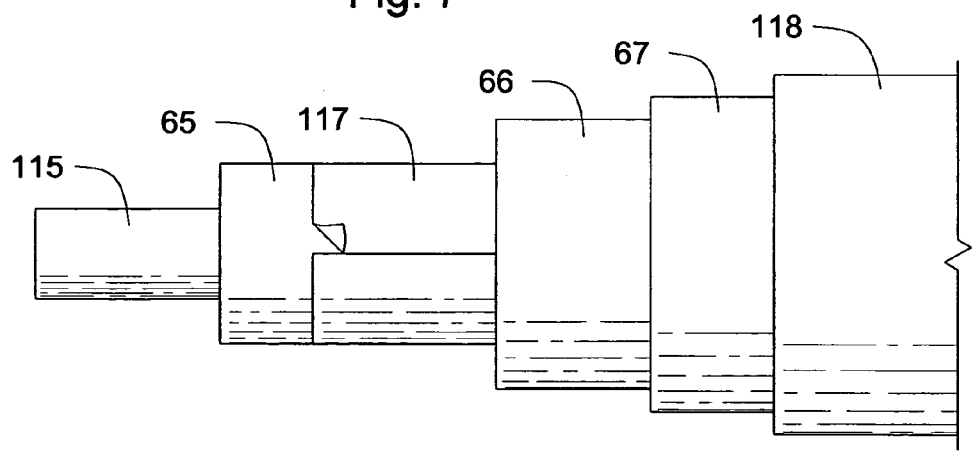
FIG. 8 is an exploded view of an embodiment of an electrical conductor.

FIG. 8 illustrates an embodiment comprising a taped shield 117. Although the taped shield 117 surrounds the inner dielectric 65, it is believed that the taped shield 117 interacts with the inner shield 66. The use and benefit of taped shields are well known in the art. In this embodiment, the inner core 64 is a solid core 115, and the outer shield is a solid shield 118.

Figure 9:
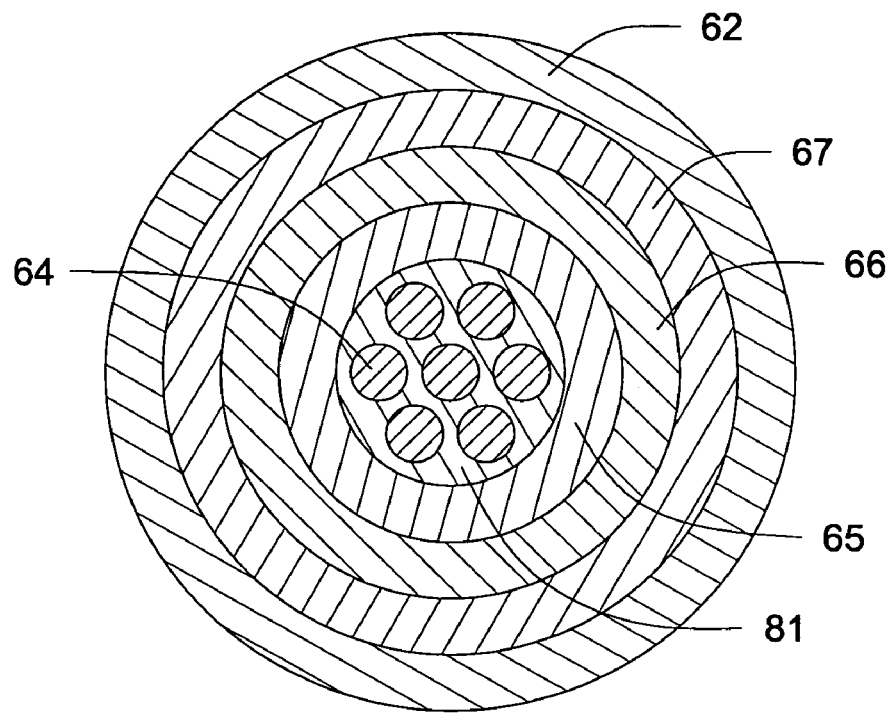
FIG. 9 is a cross sectional view of an embodiment of an electrical conductor.
Figure 10:
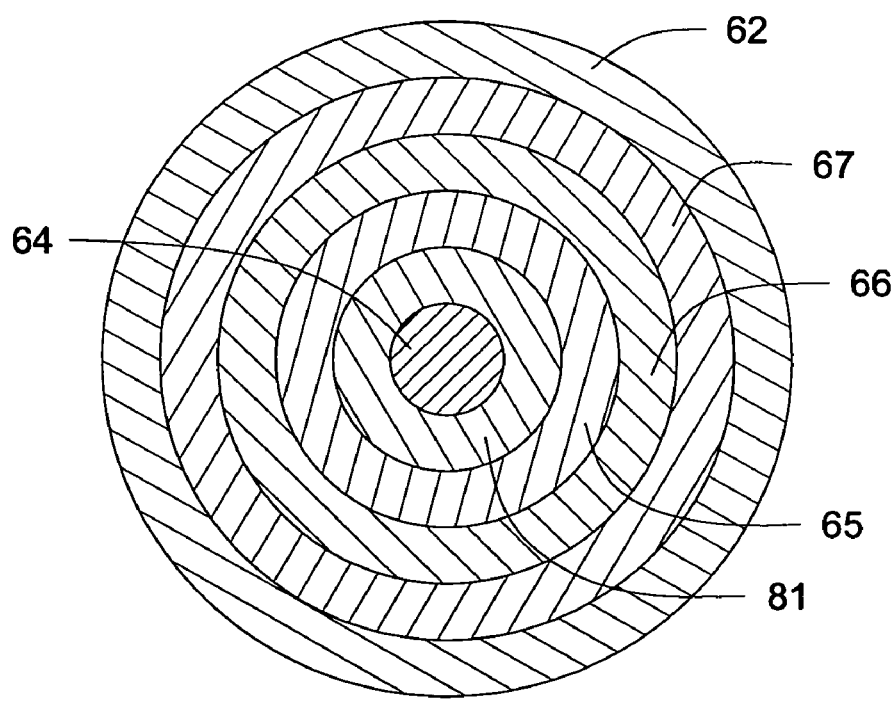
FIG. 10 is a cross sectional view of an embodiment of an electrical conductor.
Figure 11:
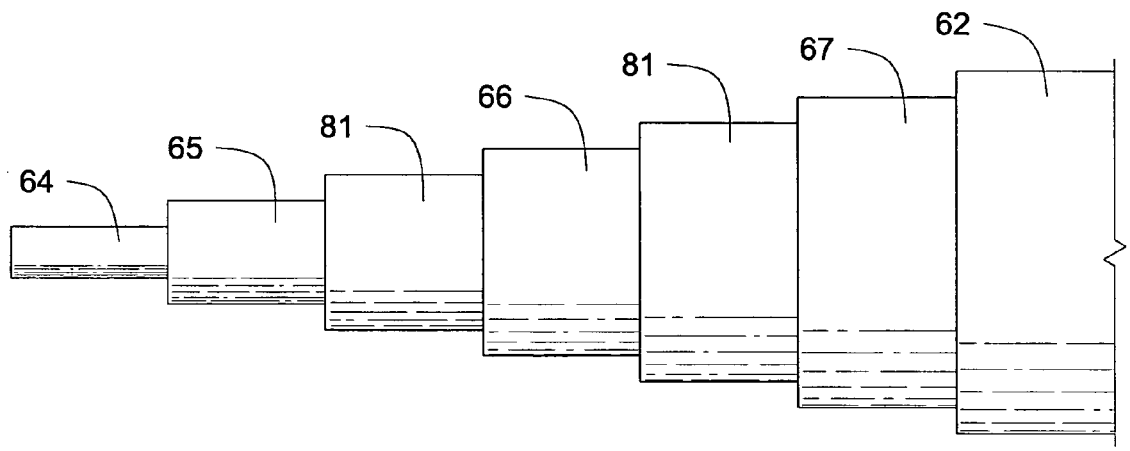
FIG. 11 is an exploded view of an embodiment of an electrical conductor.

FIGS. 9, 10, 11 show embodiments of electrical conductors 44 comprising semi-conductive material 81. FIG. 9 shows an embodiment comprising at least one core 64 encapsulated in a semi-conductive material 81. FIG. 10 shows an embodiment of the present invention, comprising a single inner core 64 surrounded by a semi-conductive material 81. FIG. 11 shows an embodiment of an electrical conductor 44 comprising an inner shield 66 disposed between two layers of semi-conductive material 81. The benefits and types of semi-conductive material in electrical conductors 44 are well known in the art.

Figure 12:
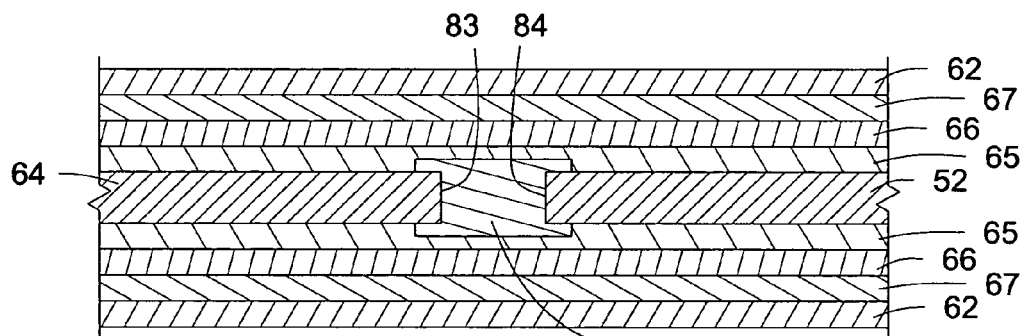
FIG. 12 is a cross sectional view of an embodiment of a connection between the electrical conductor and the coil.
Figure 38:
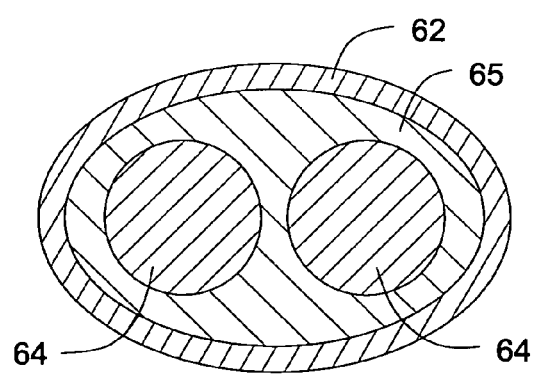

FIG. 12 shows an embodiment of a connection between the electrical conductor 44 and the lead wire 52 of the coil 45. An inner core receptacle 83 in the connector 82 accepts a portion of the inner core 64 of the electrical conductor 44. A lead wire receptacle 84 accepts a portion of the lead wire 52. Preferably, the outer shield 62 is grounded along the length of the electrical conductor 44. In some embodiments the inner shield 66 of the electrical conductor 44 is grounded at one end; however, in other embodiments, the inner shield 66 is grounded at both ends. The means of grounding the inner shield 66 are well known in the art.

Figure 13:
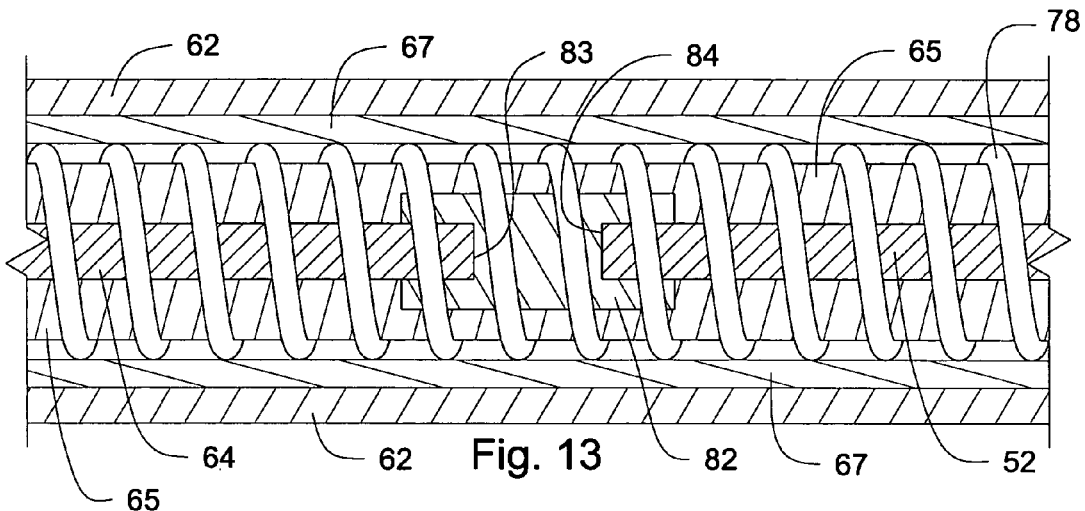
FIG. 13 is a cross sectional view of an embodiment of a connection between the electrical conductor and the coil.

FIG. 13 shows an embodiment of a connection between the inner core 64 of the electrical conductor 44 and the lead wire 52 of the coil 45. In some embodiments of the present invention, the spiral wire 78 is grounded on one end, and in other embodiments the spiral wire 78 is grounded on both ends. The means for grounding the spiral wire 78 are well known in the art.

Figure 14:
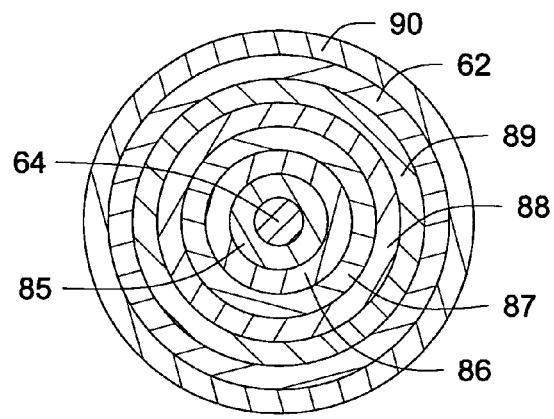
FIG. 14 is cross sectional view of an embodiment of an electrical conductor.
Figure 15:
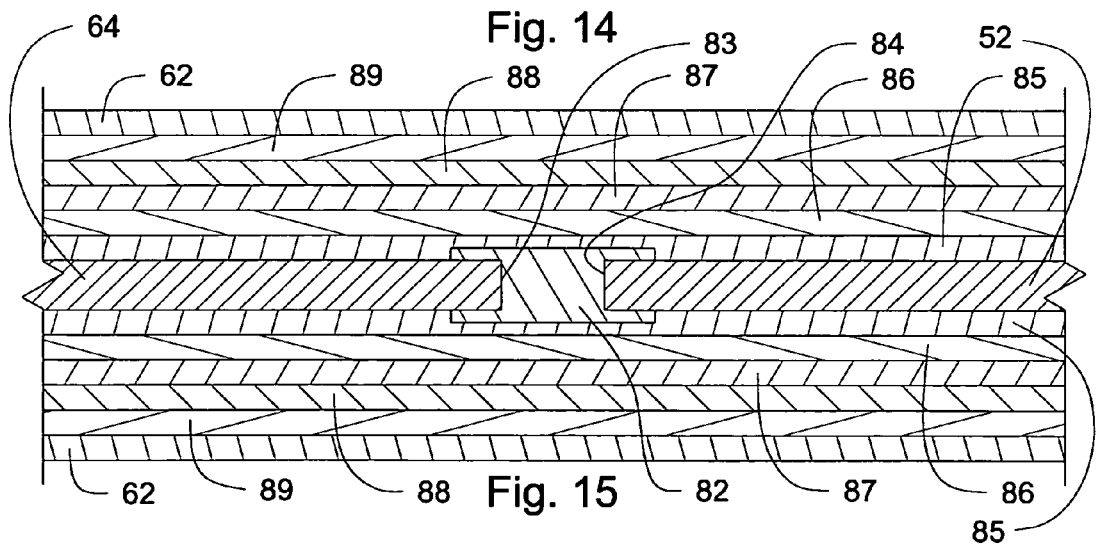
FIG. 15 is a cross sectional view of an embodiment of a connection between the electrical conductor and the coil.

FIG. 14 shows an embodiment of a multi-axial cable 91. In this embodiment the multi-axial cable 91 comprises an inner core 64, a first dielectric 85, a first shield 86, a second dielectric 87, a second shield 88, a third dielectric 89, and an outer shield 62. Also shown in FIG. 14 is an insulating jacket 90. In some embodiments the electrical conductor 44 comprises an insulating jacket 90. A multi-axial cable 91 comprises at least three shields. In some embodiments of the multi-axial cable 91, the first shield 86 and the second shield 88 are grounded. In embodiments of the multi-axial cable 91, where the first shield 86 and the second shield 88 are not ground, it is believed that the shields 86, 88 enhance the dielectric's properties and reduce interference. FIG. 15 shows an embodiment of a connection of a multi-axial cable 91 to the lead wire 52 of the coil 45.

Figure 16:
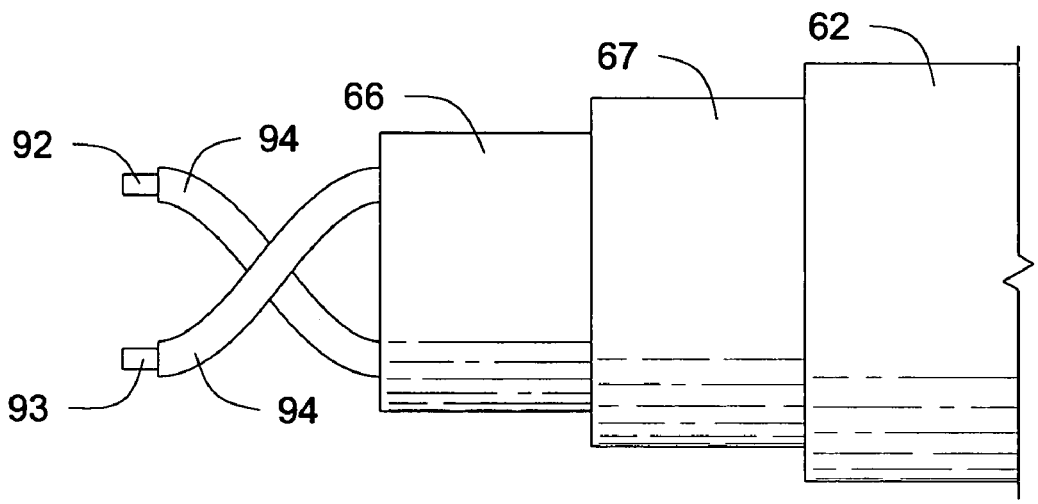
FIG. 16 is an exploded view of an embodiment of an electrical conductor.
Figure 17:
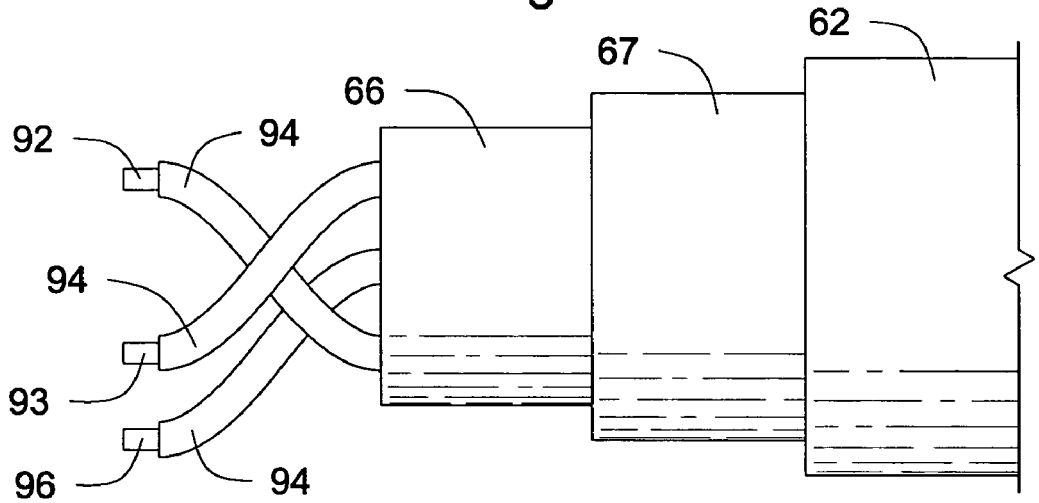
FIG. 17 is an exploded view of an embodiment of an electrical conductor.
Figure 18:
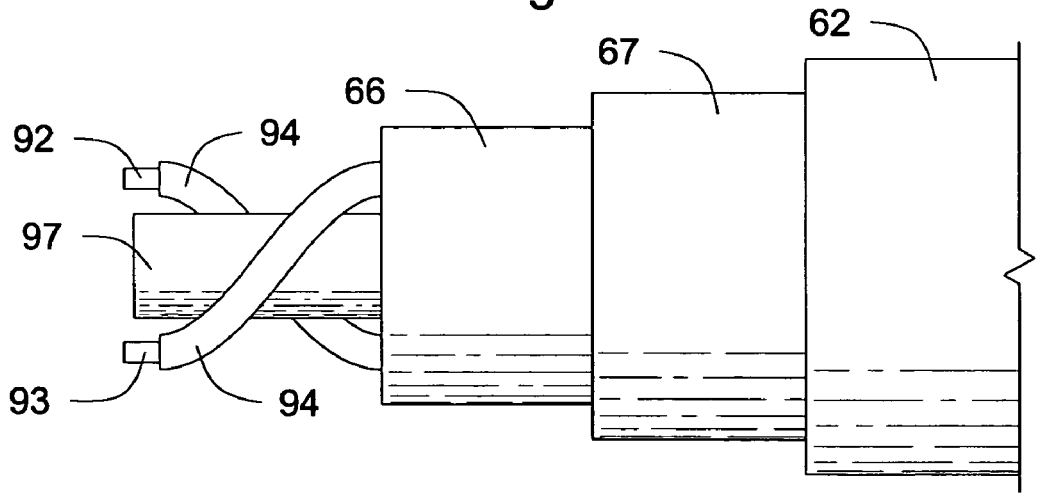
FIG. 18 is an exploded view of an embodiment of an electrical conductor.

FIGS. 16, 17, 18 show embodiments of electrical conductors 44 comprising twisted wires 92, 93, 96. In FIG. 16 a shielded pair of twisted wires 92, 93 is insulated with an insulating layer 94. Preferably, the insulating layer 94 is comprised of a polymer or a rubber. It is believed that the inner shield 66 reduces the interference that an unshielded twisted pair of wires experiences. In one embodiment, wire 92 carries the signal, while wire 93 is a return path. In another embodiment of the pair of twisted wires as shown in FIG. 16, both wire 92 and 93 carry the signal and the inner shield 66 is the return path.

FIG. 17 shows an embodiment of the three twisted wires 92, 93, 96 in an electrical conductor 44. In one embodiment of the electrical conductor 44 as shown in FIG. 17, wire 93 is a return path and wire 92 and wire 96 carry the signal. In another embodiment, the all three wires 92, 93, 96 carry the signal and the inner shield 66 is the return path. In another embodiment, wires 92 and 96 carry the signal and wire 93 and the inner shield 66 are return paths. FIG. 18 shows an electrical conductor 44 comprising a coaxial spacer 97. In one embodiment the coaxial spacer 97 separates wires 92 and 93 reduces crosstalk between the wires 92, 93. In another embodiment of the electrical conductor 44 shown in FIG. 18, the coaxial spacer 97 is electrical conductive and is the return path.

Figure 21:
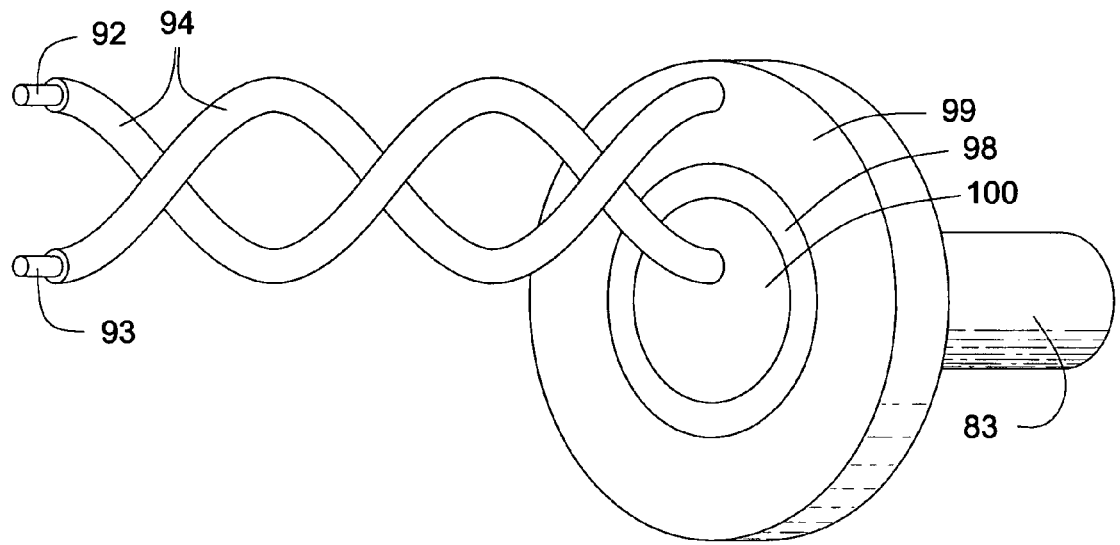
FIG. 21 is a perspective view of an embodiment of a connection between the electrical conductor and the coil.

FIG. 21 shows an embodiment of a connection between a pair of twisted wires 92, 93. Wire 92 connects to an inner contact 100. Wire 93 connects to an outer contact 99. The inner contact 100 and the outer contact 99 are separated by dielectric 98. The inner contact 100 connects to the lead wire receptacle 83, which receives the lead wire 52 of the coil 45, while the outer contact 99 leads to ground.

Figure 19:
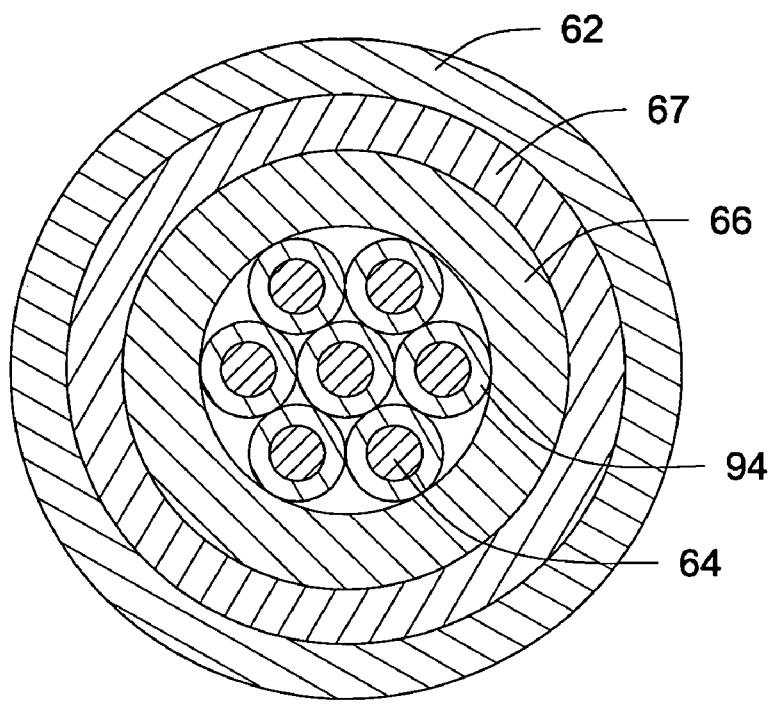
FIG. 19 is a cross sectional view of an embodiment of an electrical conductor.

An embodiment of the electrical conductor 44 comprising multiple inner cores 64, each insulated with an insulating layer 94, is shown in FIG. 19. In this embodiment, the electrical conductor 44 comprises an inner shield 66, an outer dielectric 67, and an outer shield 62. It is believed that the multiple inner cores 64 increase the reliability of the electrical conductor 44.

Figure 20:
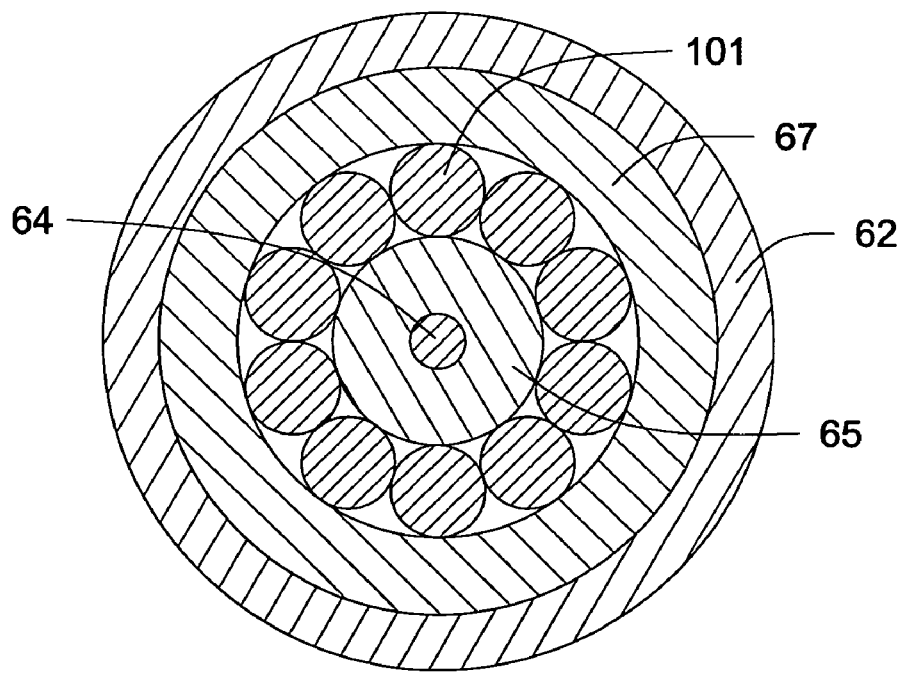
FIG. 20 is a cross sectional view of an embodiment of an electrical conductor.

In FIG. 20, the electrical conductor 44 comprises a layer of shield cores 101. In one embodiment the inner core 64 carries the signal and the shield cores 101 are the return path. In another embodiment the shield cores 101 carry the signal and the inner core 64 is the return path.

Figure 22:
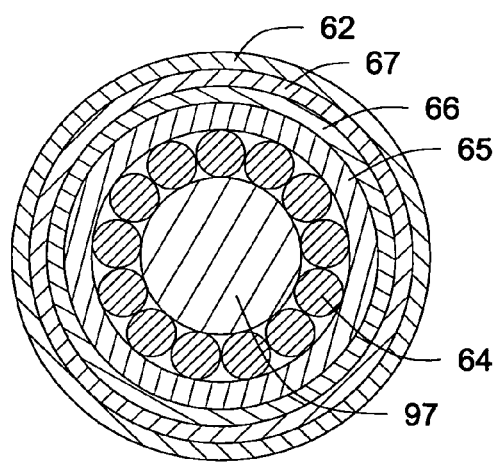
FIG. 22 is a cross sectional view of an embodiment of an electrical conductor.

An embodiment of an electrical conductor 44 comprising a coaxial spacer 97 is shown in FIG. 22. Multiple inner cores 64 surround the coaxial spacer 97. The coaxial spacer 97 may be made of a polymer or a rubber. It is believed that this embodiment provides a more reliable electrical conductor 44.

Figure 23:
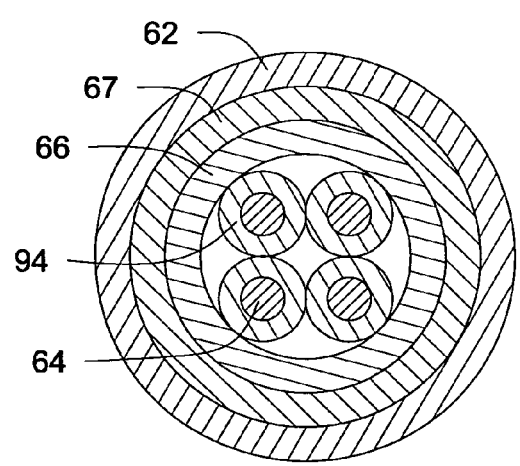
FIG. 23 is a cross sectional view of an embodiment of an electrical conductor.

FIG. 23 shows another embodiment of an electrical conductor 44. In this embodiment four inner cores 64 are insulated, each with an insulating layer 94. The electrical conductor 44 also comprises an inner shield 66, an outer dielectric 67, and an outer shield 62. In one embodiment of the electrical conductor 44 shown in FIG. 23, all four inner cores 64 carry the signal and the inner shield 66 is the return path. In other embodiments, two of the inner cores 64 carry the signal and two of the inner cores 64 are return paths.

Figure 24:
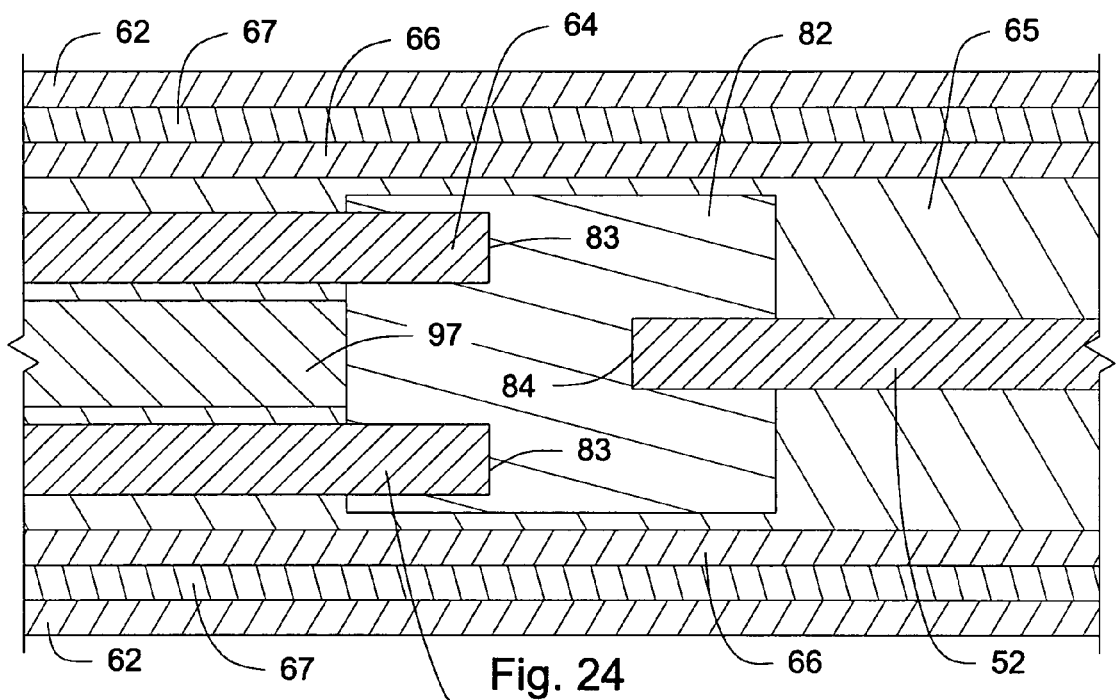
FIG. 24 is a cross sectional view of an embodiment of a connection between the electrical conductor and the coil.

FIG. 24 shows an embodiment of a connection between an electrical conductor 44 comprising a coaxial spacer 97 and the lead wire 52 of the coil 45. The connector 82 comprises lead wire receptacle 84 and several inner core receptacles 83. It is believed that the surface area of the inner cores 64 and thickness of dielectrics are two factors that impact the electrical impedance of an electrical conductor 44. It is preferable that the connector 82 has similar electrical impedance to the electrical conductor 44 to reduce reflections. It is also preferred that the electrical impedance of the lead wire 52 is similar to the electrical impedance of the electrical conductor 44. In the embodiment of the electrical conductor 44, shown in FIG. 24, the surface area of the inner cores 64 compared to the lead wire 52 may be significantly different and the thicknesses of their dielectrics may also be significantly different. One method known in the art to match the impedance of the lead wire 52 of the coil 45 to the impedance of the electrical conductor 44 is to use two different dielectric materials with different electrical characteristics. Another method to match the impedances is placing a capacitor in parallel with either the electrical conductor 44 or in the lead wire 52. Other methods are well known in the art.

Figure 25:
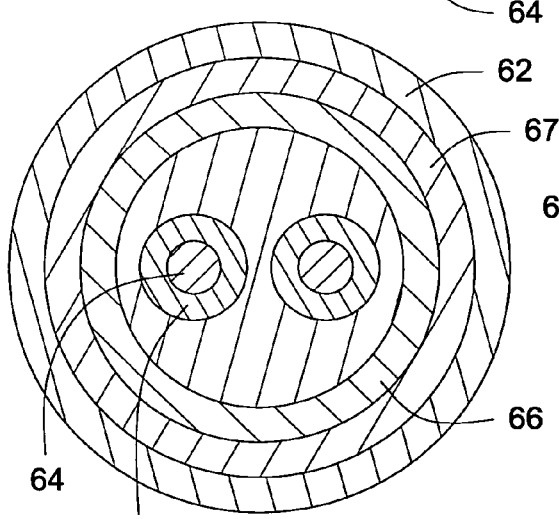
FIG. 25 is a cross sectional view of an embodiment of an electrical conductor.
Figure 26:
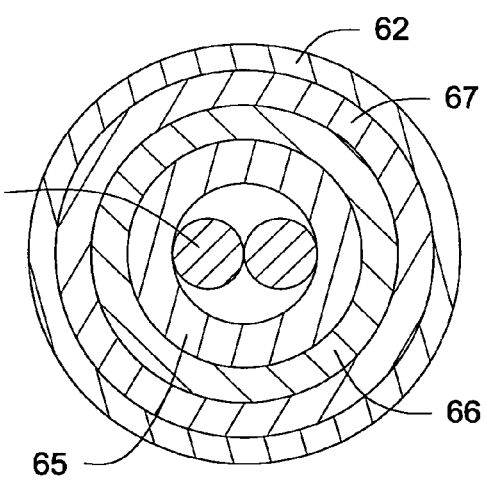
FIG. 26 is a cross sectional view of an embodiment of an electrical conductor.

Embodiments of an electrical conductor 44 comprising two inner cores 64 are shown in FIGS. 25 and 26. The embodiment in FIG. 25 has an insulating layer 94 around each of the inner cores 64. In this embodiment the return path may be either the inner shield 66 or one of the inner cores 64. The embodiment of the electrical conductor 44 in FIG. 26 comprises an inner dielectric 65, which surrounds both inner cores 64.

Figure 27:
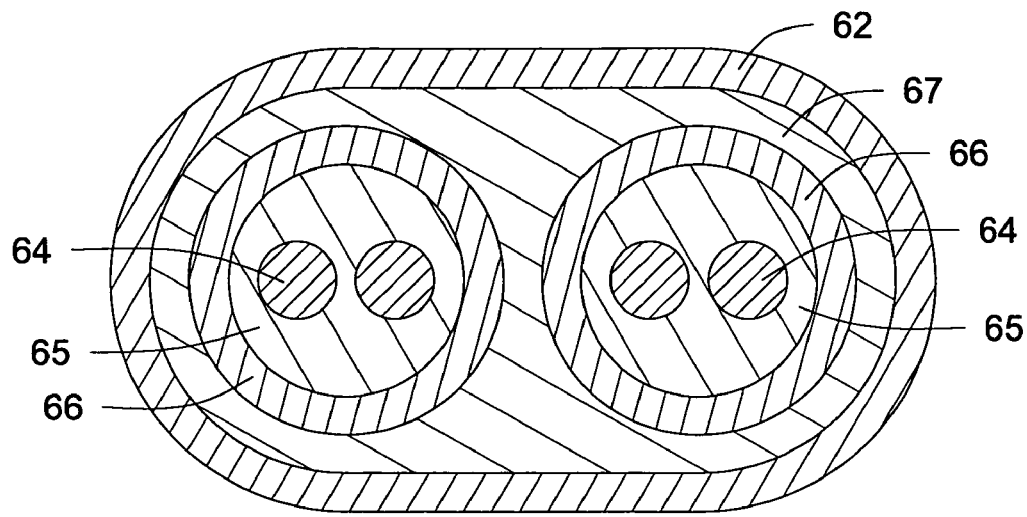
FIG. 27 is a cross sectional view of an embodiment of an electrical conductor.

In one aspect of the present invention, the two inner cores 64 are separated from two other inner cores 64 by two inner shields 66. An embodiment of this aspect of the invention is shown in FIG. 27. Within each inner shield 66, one inner core 64 may carry the signal while the other inner core 64 is the return path. In another embodiment, the inner shield 66 is the return path and both inner cores 64 may carry the signal.

Figure 28:
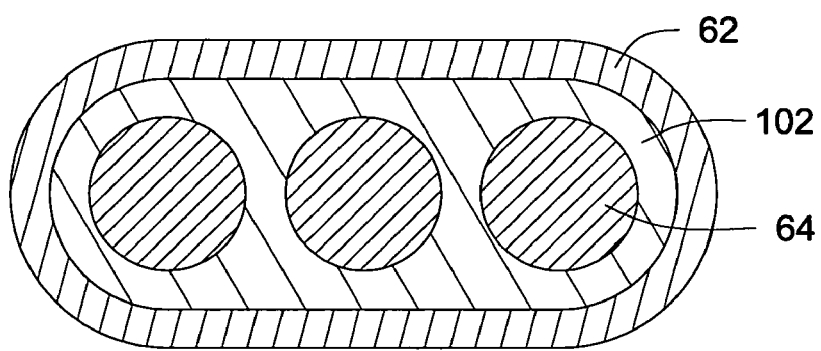
FIG. 28 is a cross sectional view of an embodiment of an electrical conductor.

In another aspect of the present invention, a single dielectric 102 separates three inner cores 64. In one embodiment, one inner core 64 may be a return path and the other two inner cores 64 may carry the signal. In another embodiment, the outer shield 62 may be the return path and all three of the inner cores 64 may carry the signal. It is believed that an electrical conductor 44 with three inner cores 64 increases the reliability of the electrical conductor 44. An embodiment is shown in FIG. 28.

Figure 29:
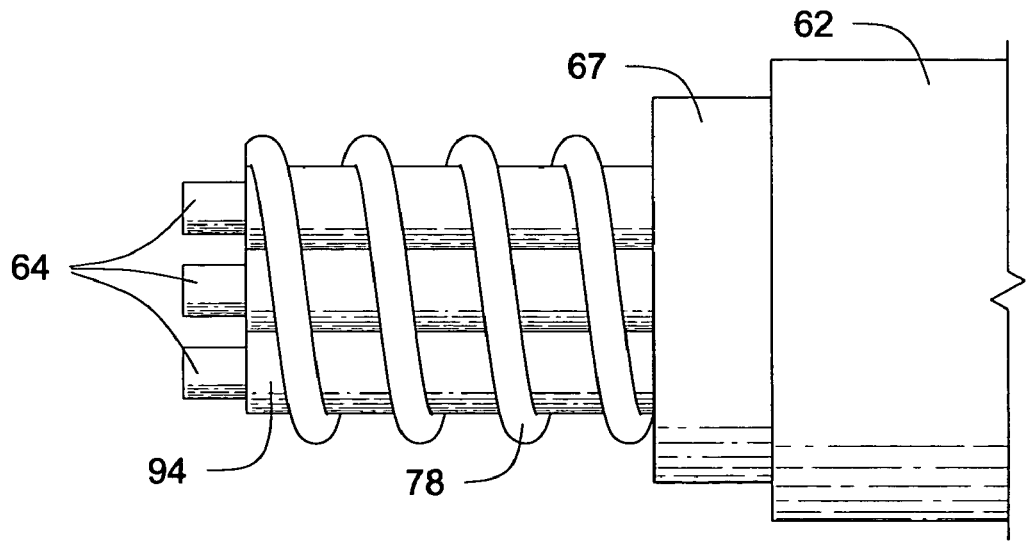
FIG. 29 is an exploded view of an embodiment of an electrical conductor.
Figure 30:
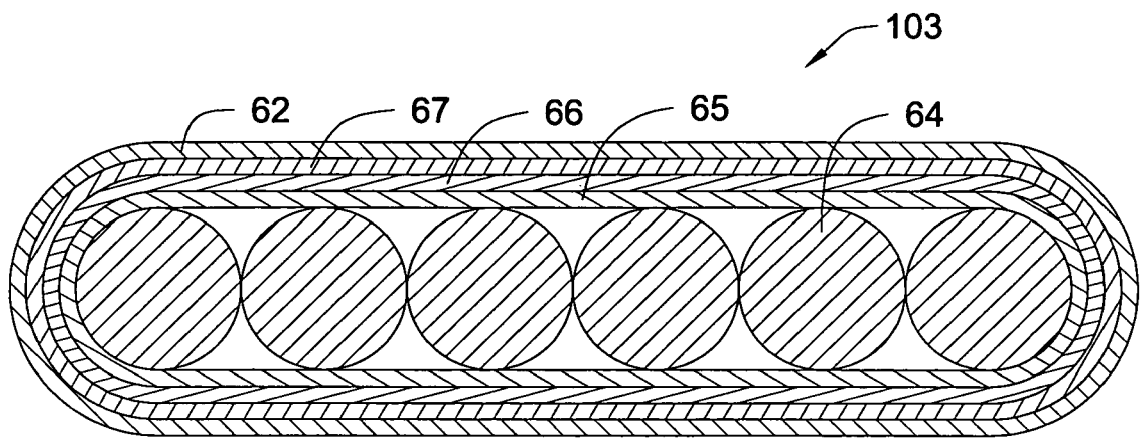
FIG. 30 is a cross sectional view of an embodiment of an electrical conductor.

In another aspect of the present invention, a spiral wire 78 wraps around three insulated inner cores 64 and a dielectric 67 separates the spiral wire 78 from the outer shield 62. An embodiment is shown in FIG. 29. In one embodiment, the spiral wire 78 is the return path. In another embodiment, one of the inner cores 64 may be the return path. In another embodiment, the spiral wire 78 and one of the inner cores 64 may be the return path.

In one aspect of the invention, the electrical conductor 44 comprises a ribbon cable 103. FIGS. 30, 31, 32, and 34 show embodiments of ribbon cables 103. Ribbon cables 103 are believed to increase the reliability of the transmission system of the downhole component 73. If a portion of the ribbon cable 103 is damaged, a non-damaged portion of the ribbon cable 103 may be able to carry the signal and continue signal transmission despite the damage. In one aspect of the ribbon cable 103, one or more of the inner cores 64 may be the return path. In another aspect of the ribbon cable 103, the inner shield 66 may be the return path. FIG.

Figure 31:
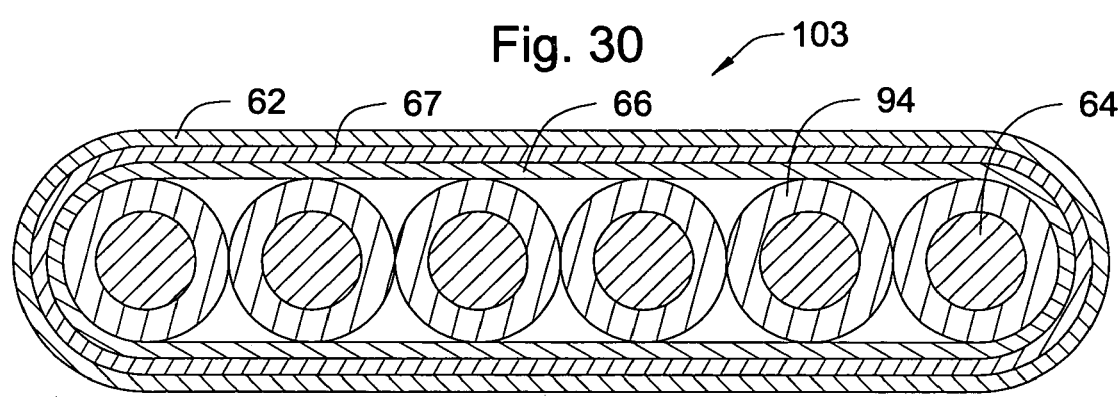
FIG. 31 is a cross sectional view of an embodiment of an electrical conductor.
Figure 32:
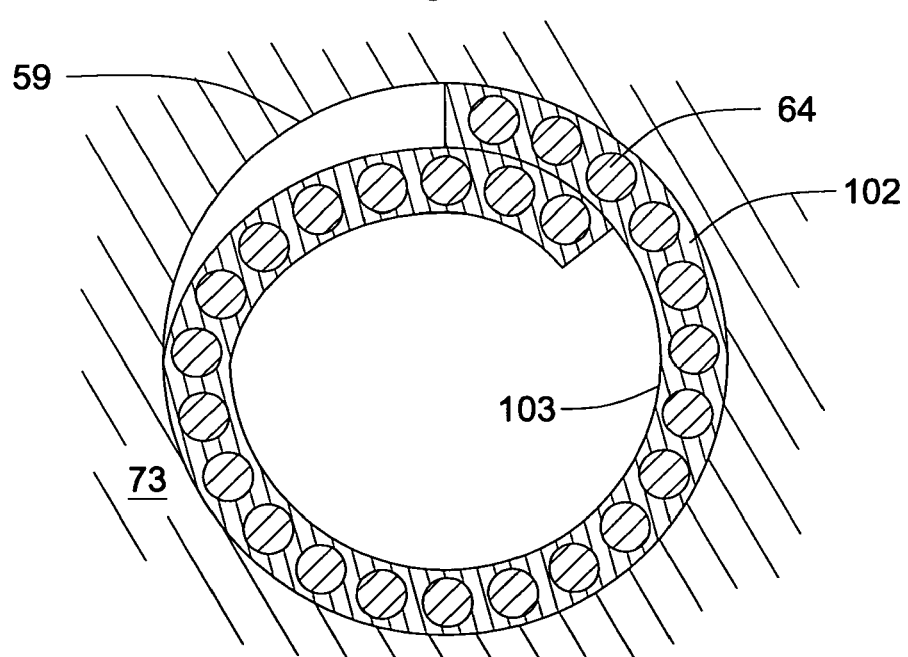
FIG. 32 is a cross sectional view of an embodiment of an electrical conductor disposed in a passage.
Figure 33:
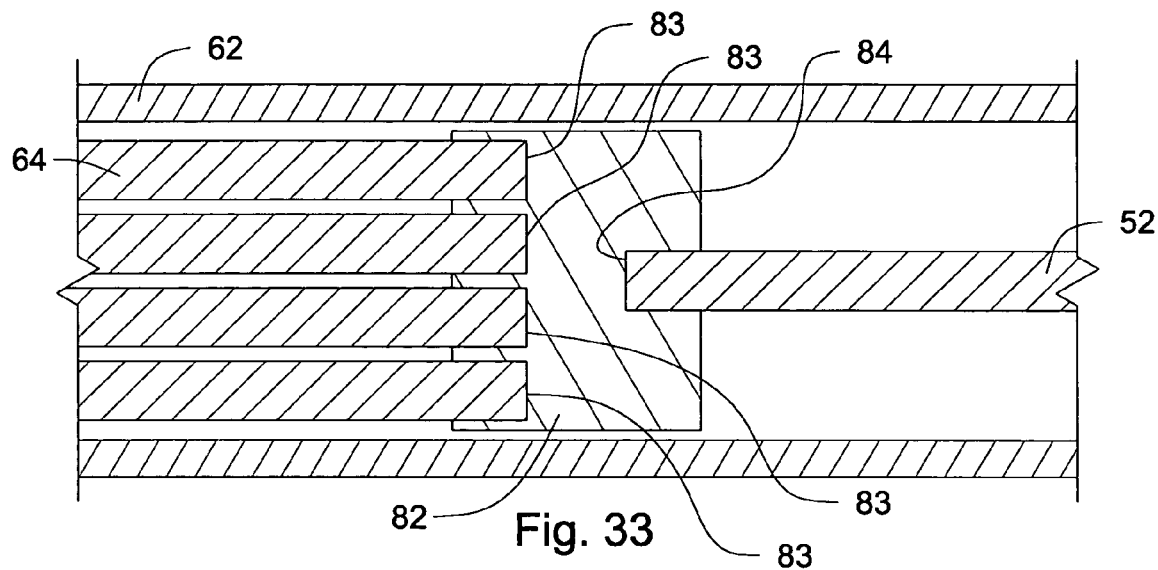
FIG. 33 is a cross sectional view of an embodiment of a connection between the electrical conductor and the coil.
Figure 34:
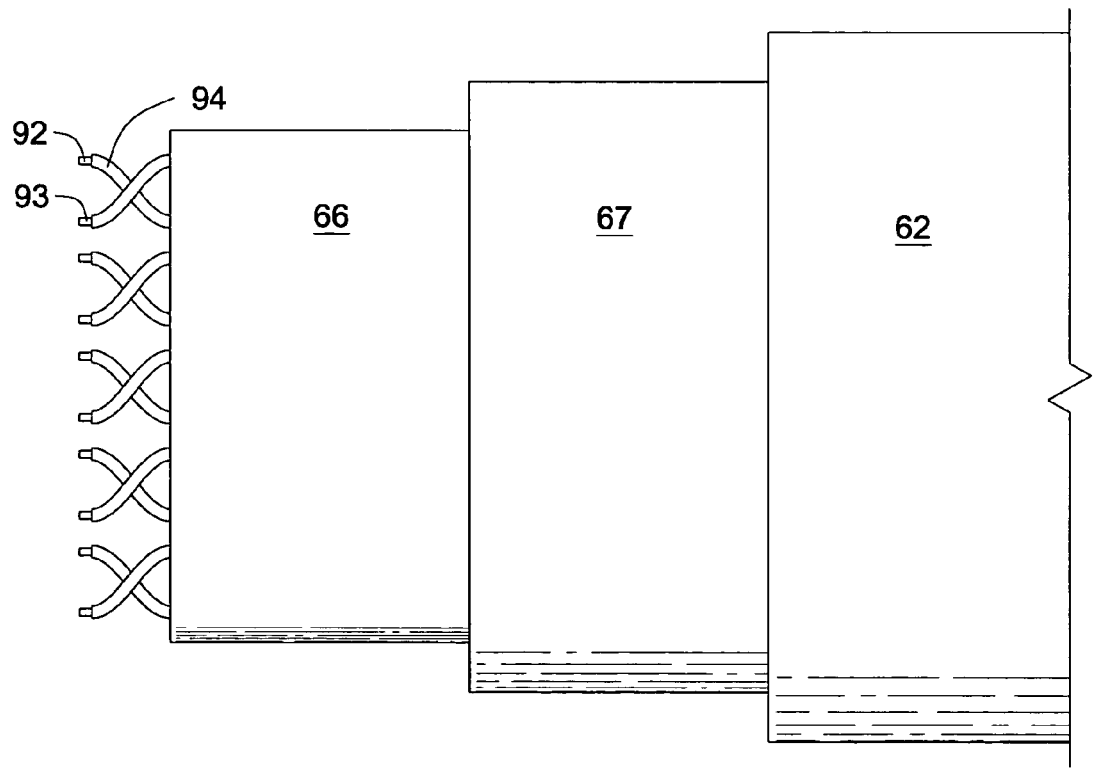
FIG. 34 is an exploded view of an embodiment of an electrical conductor.

30 shows multiple inner cores 64 surrounded by an inner dielectric 65. FIG. 31 shows a ribbon cable 103 comprising inner cores 64 with insulated layers 94. FIG. 32 shows a single dielectric 102 separating multiple inner cores 64. FIG. 32 also shows an embodiment of a ribbon cable 103 rolled into the passage 59 of a downhole component 73. In another aspect of the present invention, the passage 59 in the downhole component 73 is flat and the ribbon cable 103 may lie flat within the passage 59. FIG. 33 shows an embodiment of a connection between a ribbon cable 103 and a lead wire 52 of a coil 45. FIG. 34 shows an embodiment of a ribbon cable 103 comprising several pairs of twisted wires 92, 93.

Figure 35:
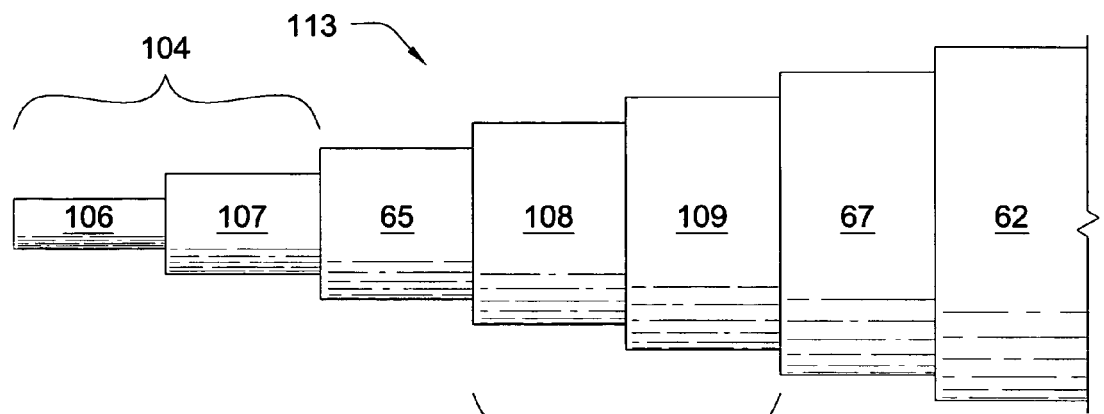
FIG. 35 is an exploded view of an embodiment of an electrical conductor.
Figure 36:
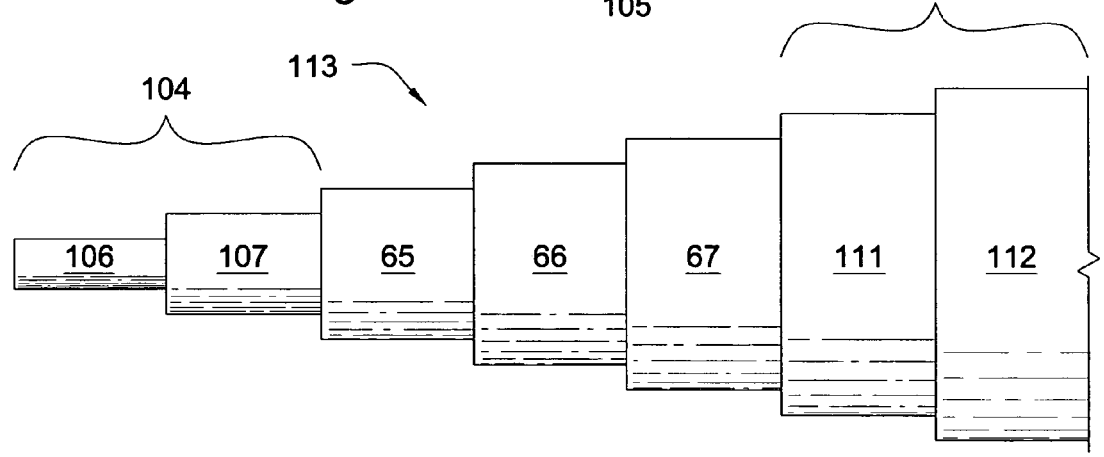
FIG. 36 is an exploded view of an embodiment of an electrical conductor.
Figure 37:
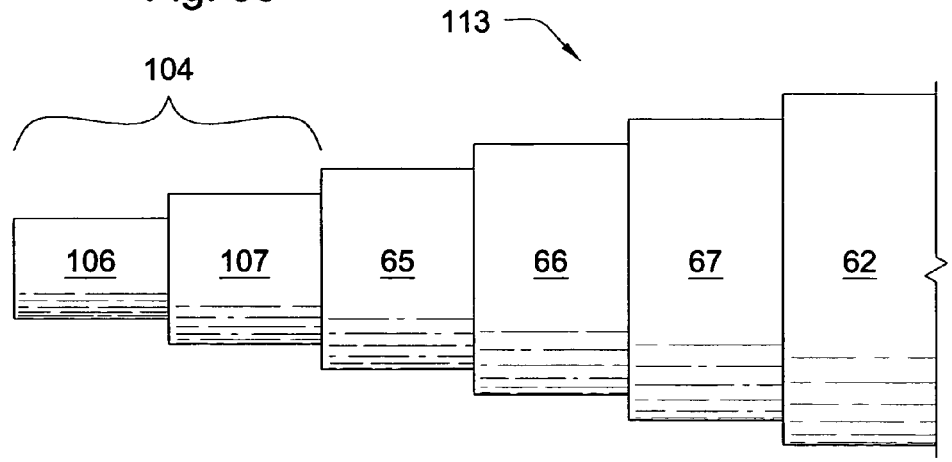
FIG. 37 is an exploded view of an embodiment of an electrical conductor.

FIGS. 35, 36, and 37 illustrate an expandable electrical conductor 113. FIG. 35 comprises an expandable electrical conductor 113 comprising a double core 104, an inner dielectric 65, a double shield 105, an outer dielectric 67, and an outer shield 62. The double core 104 comprises a core center 106 and a core shell 107. The double shield 105 comprises an inner shield center 108 and an inner shield shell 109. The tension from the weight of the downhole tool string 68 stretches its downhole components 57, 72, 73, 74. An expandable electrical conductor 113 may lengthen as the components lengthen avoiding breaks in the transmission system. Preferably, the core center 106 is attached to one end of the downhole component 73 and the core shell 107 is attached to the other. Preferably, the inner shield center 108 is attached to one end of the downhole component 73 and the inner shield shell 109 is attached to the other.

FIG. 36 shows an embodiment of an expandable electrical conductor 113 comprising a double core 104 and a double outer shield 110. The double outer shield 110 comprises an outer shield center 111 and an outer shield shell 112. FIG. 37 shows an embodiment of the expandable electrical conductor 113 comprising a double core 104, an inner dielectric 65, an inner shield 66, an outer dielectric 67, and an outer shield 62. In this embodiment, it is believe that if the double core 104 lengthens and the inner shield 66 and the outer shield 62 do not lengthen that the signal may still be transmitted as long as the outer shield 62 is grounded to the downhole component 73.

What is claimed:

1. An integrated data transmission network comprising a plurality of data transmission systems of a plurality of individual downhole tools coupled end to end and operating in a downhole drilling environment, each of the data transmission systems comprising:
    a data transmission element comprising an electrically conducting coil in a MCEI trough mounted in each end of each of the tool and cooperatively arranged to be in magnetic but not electrical communication with the data transmission element of the adjacent tool,
    an electrical conductor interconnecting the data transmission elements, wherein the electrical conductor comprises at least one outer shield and at least two electrically conductive elements coaxially arranged within the shield and coaxially arranged one within the other such that the outer shield and each of the electrically conductive elements share a common axis.

2. The integrated data transmission network of claim 1, wherein the MCEI trough comprises ferrite.

3. The integrated data transmission network of claim 1, wherein the electrically conducting coil comprises a wire.

4. The integrated data transmission network of claim 1, wherein the electrically conducting coil comprises an insulated wire.

5. A transmission system in downhole components comprising:
    a plurality of data transmission elements comprising electrically conducting coils in MCEI circular troughs,
        the data transmission elements mounted in the ends of each of the downhole components and cooperatively arranged to be in magnetic but not electrical communication with data transmission elements of the adjacent component,
    an electrical conductor connecting the transmission elements within each component, wherein the electrical conductor comprises an electrical conducting outer shield and at least two other electrically conductive elements insulated from each other and wherein the at least two other electrically conductive elements are coaxially arranged within one another and within the outer shield such that the outer shield and each of the electrically conductive elements share a common axis.

6. The transmission system of claim 5, wherein the MCEI trough comprises ferrite.

7. A transmission system in a downhole component, comprising:
    a data transmission element in each end of the downhole component,
        each data transmission element comprising an electrically conducting coil in a MCEI circular trough mounted in each end of each of the downhole component and cooperatively arranged to be in magnetic but not electrical communication with an adjacent tool,
    an electrical conductor in the downhole component connecting the transmission elements, wherein the electrical conductor comprises an electrical conducting outer shield, an electrically conductive inner shield, and an electrical conductive core each insulated from each other and wherein the outer shield, the inner shield, and the electrical conductive core are each coaxially arranged one within the other such that they share a common axis.

8. The transmission system of claim 7, wherein the MCEI trough comprises ferrite.

* * * * *